United States Patent [19]

Hung

[11] 4,343,696

[45] Aug. 10, 1982

[54] SYSTEM FOR REMOVING SLUDGE FROM DAM RESERVOIR

[76] Inventor: Pai-Yen Hung, No.3-1, Alley 4, Lane 81, Kuang-Chou St., Taipei, Taiwan

[21] Appl. No.: 231,115

[22] Filed: Feb. 3, 1981

[51] Int. Cl.³ .............................................. B01D 21/24
[52] U.S. Cl. ................................. 210/85; 210/170; 210/298; 405/74
[58] Field of Search ................. 210/85, 170, 513, 254, 210/258, 298; 405/74

[56] References Cited

U.S. PATENT DOCUMENTS

| | | | |
|---|---|---|---|
| 1,907,691 | 5/1933 | Wait | 210/170 |
| 3,412,862 | 11/1968 | Chaplin | 210/170 X |
| 3,470,091 | 9/1969 | Budd et al. | 210/170 X |
| 3,838,774 | 10/1974 | Dolan | 210/85 |
| 3,854,291 | 12/1974 | Perkins | 210/170 X |
| 4,264,105 | 4/1981 | Thompson | 405/74 X |

*Primary Examiner*—John Adee
*Attorney, Agent, or Firm*—Cushman, Darby & Cushman

[57] ABSTRACT

An improved system for removing sludge from dam reservoir comprises a suction port, a delivery pipe, a float, a tug boat, several universal joints connected in the delivery pipe, a concentration alarming indicator, a boosting pipe, an ejector and a sludge consolidating means. The water of high static pressure is led through a boosting pipe into nozzles of an ejector so as to suck the air or muddy water near the bottom of a dam reservoir through the delivery pipe so that the sludge or sand existing deeply in the reservoir will be automatically discharged outside the dam without consuming electric or oil energy as driving a conventional pump.

10 Claims, 9 Drawing Figures

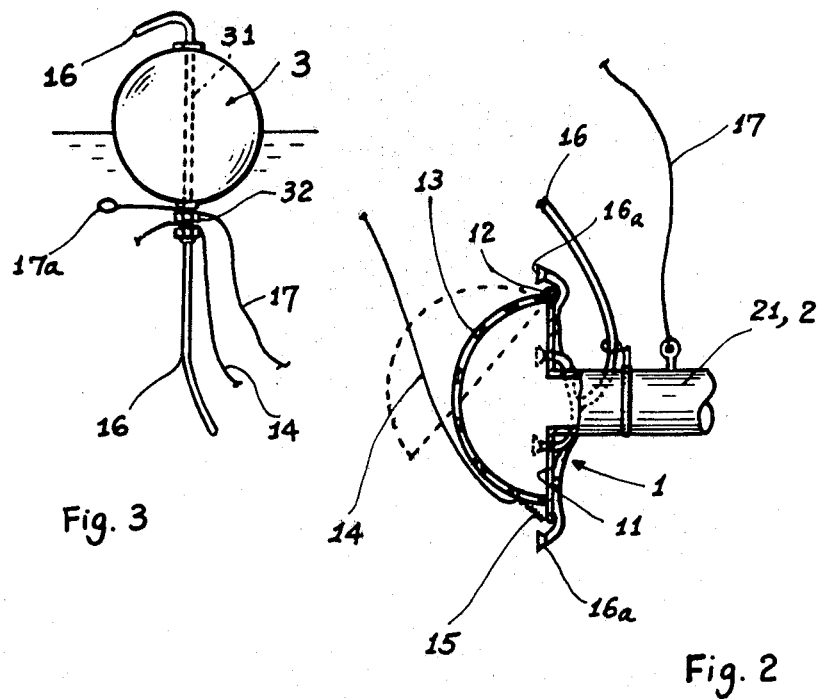

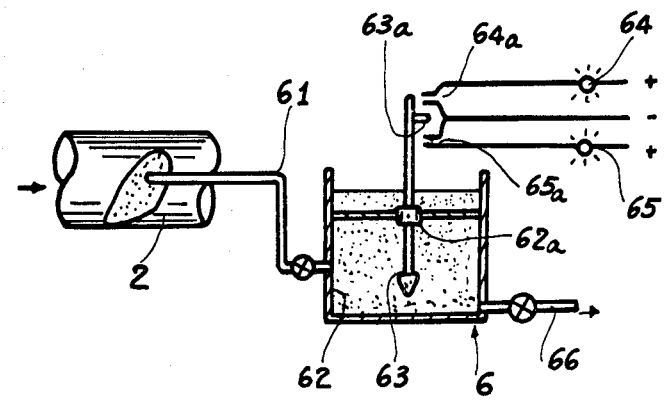
Fig. 4
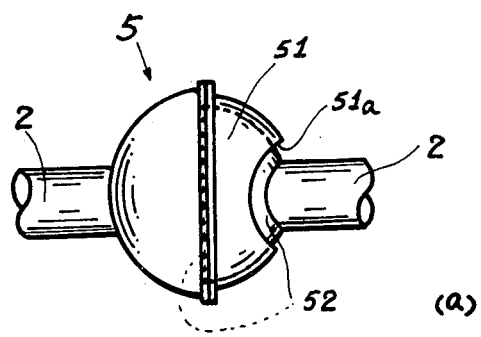
(a)
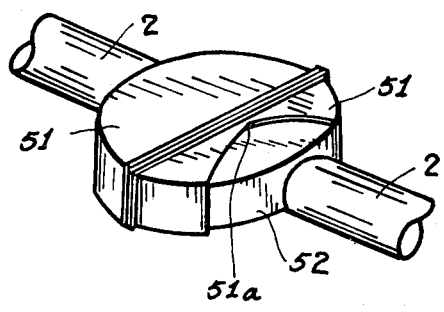
(b)
Fig. 5

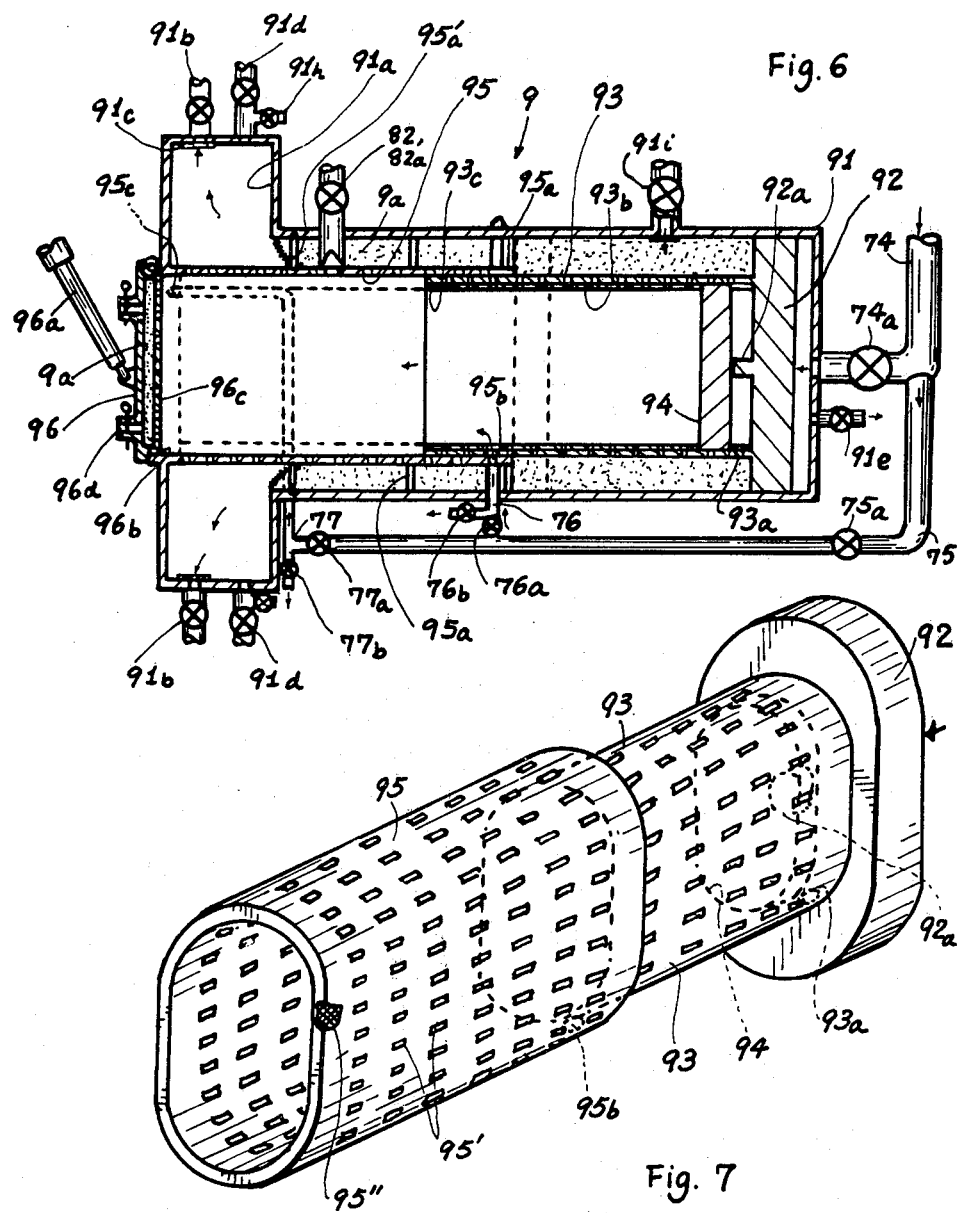

SYSTEM FOR REMOVING SLUDGE FROM DAM RESERVOIR

BACKGROUND OF THE INVENTION

The reservoir or lake of a dam may carry much sludge or sand from the upstream of the lake. The sludge or sand should be removed to prevent from its accumulation in the lake. Conventional removing method relies upon the water pump which may deliver the muddy or sandy water as driven by electric motor or diesel engine. The power or oil will then be consumed. The conventional pump may be damaged by the coarser sand or stones. The friction between the sand and the pump impeller may deteriorate the pump and shorten the service life of pump. By considering the safety operation of a pump, the sand or sludge concentration in carrying water should be controlled in a limited value so that the sludge or sand discharging rate will then be reduced. If for pumping much quantity of sludge or sand, much power or energy must be spent to increase the handling capacity and quantity of discharged water whereby the water within the reservoir will be greatly wasted.

The present inventor has found these defects and researched to disclose the present invention.

SUMMARY OF THE INVENTION

The object of the present invention is to provide an improved system for removing sludge or sand from dam reservoir in that the high pressure water near the reservoir bottom will flow through a boosting pipe into nozzles of an ejector so as to suck the air and water within the delivery pipe whose suction port is immersed in the sandy or muddy layer near the reservoir bottom so that the sludge or sand in the water may be automatically discharged outside the dam as sucked by the ejector and driven by the high static pressure at suction port under dam reservoir without the aid of conventional pump which will consume much energy.

BRIEF DESCRIPTION OF THE DRAWINGS

FIG. 2 is a partial sectional drawing of a suction port of the present invention.

FIG. 3 is an illustration showing a float of the present invention.

FIG. 4 is an illustration showing the construction of a concentration alarming indicator of the present invention.

FIG. 5 is an illustration showing two universal joints of the present invention.

FIG. 6 is a section drawing of a sludge consolidating means of the present invention.

FIG. 7 is a partial perspective drawing of the major components of a sludge consolidating means.

DESCRIPTION OF THE PREFERRED EMBODIMENTS

Figure 1:
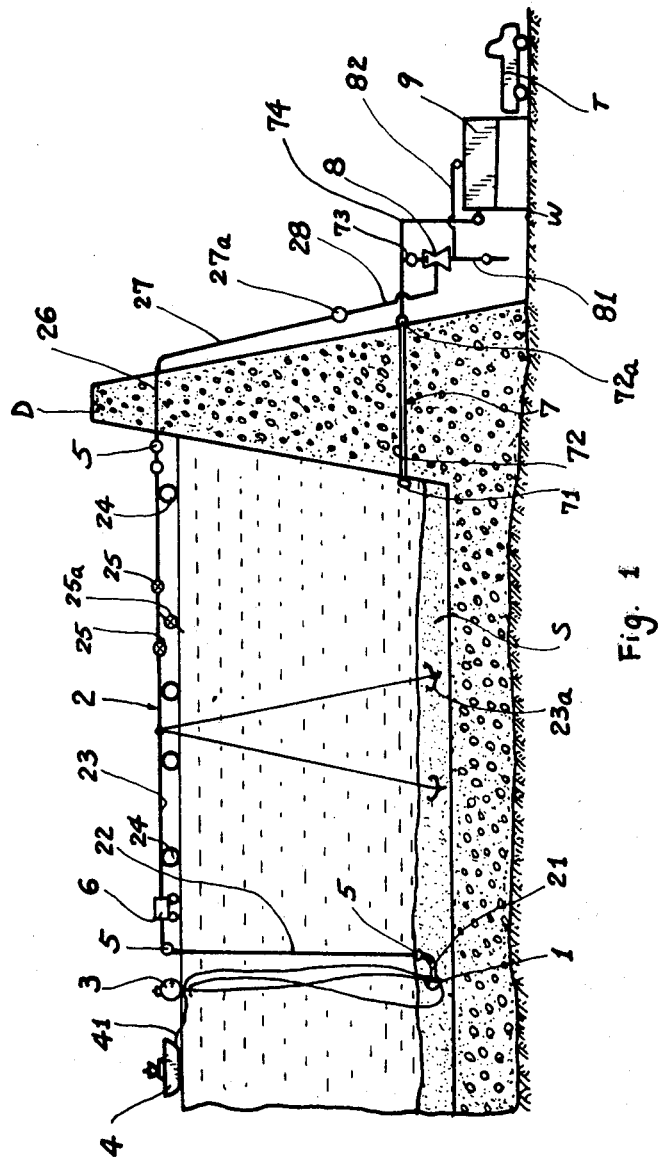
FIG. 1 is a flow sheet illustration of the present invention.

As shown in FIG. 1 to FIG. 7, the present invention comprises a suction port 1, a delivery pipe 2, a float 3, a tug boat 4, several universal joints 5 connected within said delivery pipe, a concentration alarming indicator 6, a boosting pipe 7, an ejector 8 and a sludge consolidating means 9.

Said suction port 1 comprises an extension pan 11 connected to an entrance pipe 21 of said delivery pipe 2. A hinge 12 is provided on said extension pan to pivotedly connect a filter screen 13 having one or several screens. Said filter screen 13 serves to pass sand or sludge but to stop the stones or large agglomerates. Said filter screen 13 is connected to said float 3 by a wire 14. A spring 15 is provided to automatically close said filter onto said port 1. A water hose 16 is terminated with several nozzles 16a which are disposed along said port 1 so as to wash filter screen 13 or to flush the clogging materials near said port 1 by high pressure stream. Said water hose 16 and port 1 is connected to said float 3 by hose itself and by wire 17.

Said float 3 is floated on water surface. A central jacket 31 is provided to pass said water hose 16 to a pumping source. Nuts 32 are provided to fix said wires 14, 17 onto said float 3. Said wire 17 pulls said ports 1 suspending in the muddy layer or sandy layer S near the lake bottom. A tug boat 4 is provided to adjust the position of said port 1. Wire 41 is connecting wire 17a.

Said delivery pipe 2 comprises an entrance pipe 21 near the lake bottom, a vertical pipe 22 connected to said entrance pipe 21, a horizontal pipe 23 connected to said pipe 22, several floats 24 supporting said pipe 23 afloat on lake surface, several valves 25 and angle valve 25a for occassionally flushing the sandy water flowing therein to prevent from clogging of pipe 2, a horizontal pipe 26 passing the dam D and a downward pipe 27 terminated by valve 27a and discharge pipe 28 which is connected to the throat of said ejector 8. Several universal joints 5 are provided within said pipe 2. Anchor 23a may be provided to stably fix said pipe 2 in the lake.

Said universal joint 5 as shown in FIG. 5 comprises a spherical socket having segment cut 51 and a semi-spherical cup 52 freely engaged in said socket 51. A packing 51a is provided between their boundary. Said universal joint 5 may also be made as circular disk as shown in FIG. 5(b).

Said concentration alarming indicator 6 as shown in FIG. 4 comprises an inlet tube 61 connected to said pipe 2, a container 62 for storing sandy water, a gravity meter 63 immersed in said container 62, two alarms 64, 65 respectively indicating higher concentration level and lower concentration level and an outlet tube 66 for discharging water therefrom. When sand concentration goes higher, the meter 63 having stick 63a may be raised to flip contacts 64a of said higher concentration alarm 64. The meter 63 will actuate the alarm of lower concentration 65 as lowering said meter to touch said contacts 65a. Such an indicator 6 serves as a reference for the adjustment of height or position of said suction port 1. A collar 62a is provided for the moment of said meter 63.

Said boosting pipe 7 comprises an entrance port having filter 71 which is positioned above the sandy layer S near the lake bottom. A pipe 72 is inserted through dam D and is terminated by two branches, one branch 73 directly leading into nozzles of said ejector 8 and another branch 74 leading into said sludge consolidating means 9. The downward pipe 27 of said delivery pipe 2 is leading through pipe 28 into the throat of said ejector 8 as shown in FIG. 1. The high pressure driving stream coming from said boosting pipe 7 and flowing into ejector 8 will suck the air and water within said pipe 2 so as to discharge the sludge or sand existing in the sandy or muddy layer S near the lake bottom. If the discharged fluid having much sand, the fluid will be discharged through pipe 81 for sand and water separation or treatment. If the discharged fluid having much content of sludge, it will be led into consolidating means 9 for further compressing the sludge. Otherwise, the sludge-laden water shall be disposed in a larger area for solar drying and treatment such as tripping or paring of dried mud should be further done.

The end of the downward pipe 27 should be lower than said suction port 1 to perform the syphon effect so that the upstream sludge or sand laden water will be automatically discharged through said pipe 2 once the ejector 8 is actuated to start the syphon effect. The valve of pipe 73 will then be closed to prevent from wasting water of the lake.

Figure 8:
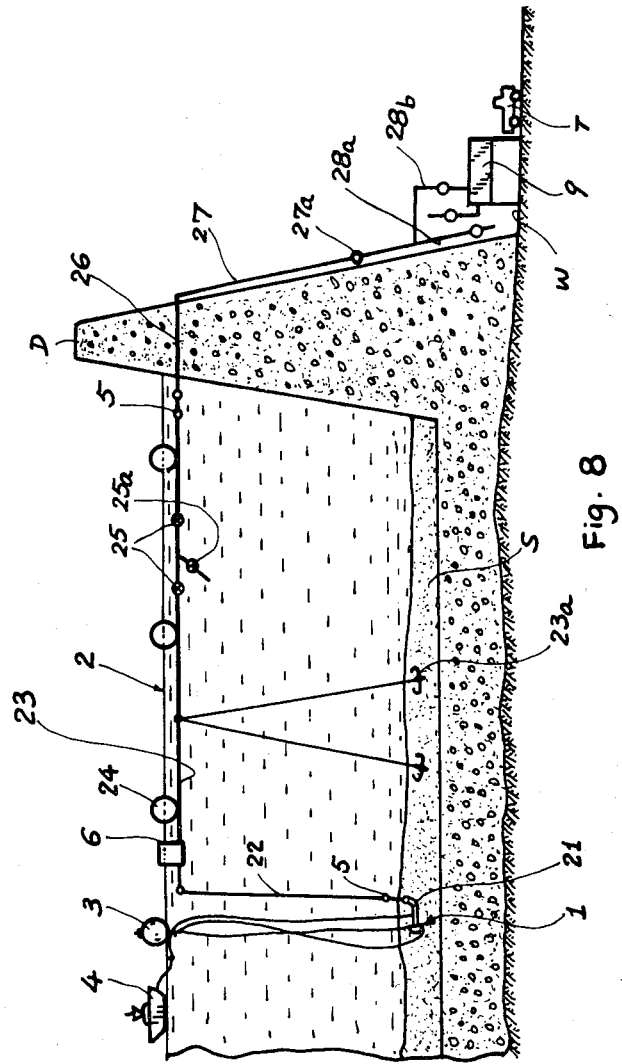
FIG. 8 is a flow sheet showing another preferred embodiment in accordance with the present invention.

If the sand or sludge concentration is not so high, the ejector 8 and the boosting pipe 7 may be omitted to save the installation cost. However, the horizontal pipes 23 and 26 should be lower than water level of the dam reservoir so that the water may be directly led outwards as immersing said pipe 2 under water. The pipe end is divided into two branches, 28a and 28b. Such an immersed pipe 23 may be fixed on the bottom of each float 24 as shown in FIG. 8.

Of course, an auxiliary pump (not shown) may also be provided within said pipe 2 to facilitate the handling of sludge or sand laden water or serve as a stand-by equipment for ejector maintenance or repair.

Said sludge consolidating means 9 as shown in FIGS. 6 and 7 comprises a compression cylinder 91 wherein a surge tank 91a is provided ahead said cylinder for partially filling sand 9a. A water drain pipe 91b having valve and filter 91c is provided on said tank 91a. A sand discharge pipe 91d having valve is also installed on said tank 91a for removing dirty filter sand 9a after long time service.

A water inlet pipe 74 having valve 74a is led into rear side of said cylinder 91. A drain valve 91e is also provided on side wall thereof. A by-pass water pipe 75 having valve 75a is led from said inlet pipe 74 to the middle and front portion of said cylinder 91. On middle portion of said cylinder, a branch pipe 76 having valve 76a and drain valve 76b is provided to connect said pipe 75. Another branch 77 having valve 77a and drain valve 77b is provided on the front portion of said cylinder 91 to connect said pipe 75. Both pipes 74 and 75 lead the high pressure water from said boosting pipe 7. The sludge-laden water is led from said ejector 8 into said cylinder 91 through pipe 82 having valve 82a.

A large piston 92 having central extension 92a and inner filter bail 93 is movably engaged within said cylinder 91. Said inner bail 93 is provided with small piston 94 movably engaged within the grooves 93b and stopped at groove end 93c of said bail 93. A water hole 93a is formed on said bail 93 and positioned near said extension 92a. Said inner filter bail 93 is movably engaged within an outer filter bail 95 which is fixed on the front portion of said cylinder 91 by brackets 95a. Said outer filter bail 95 is formed a water hole 95b coincided with said branch 76 and movably coincided with said water hole 93a when overlapping said inner bail 93 into said outer bail 95. Another water hole 95c is provided on said outer bail 95 and near said cylinder door 96. Said hole 95c is connected to said front water branch 77. Said outer bail has double plates each having filter holes 95' and a filter screen 95" bound therebetween as shown in FIG. 7. Said inner bail 93 may also be formed with filter hole and screen (not shown).

Said cylinder door 96 is driven by a hydraulic system 96a. The inside wall of said door is drilled with filter hole 96c and the outside wall is a solid plate but provided with several outlet valves 96d. The door edge is provided with sealing packing 96b. The jacket between inside wall and outside wall is filled with filter sand 9a.

When using the present sludge consolidating means 9, the sludge-laden water is led into cylinder 91 through pipe 82 so that the sludge and water will penetrate into said inner filter bail 93. By opening the valve 74a, the high pressure water will push said piston 92 and inner bail 93 forwards to press the sludge and to discharge water included in sludge through said bails, filter sand 9a and pipe 91b. After the piston 92 is obstructed by said fixed outer bail 95 as dotted line shown in FIG. 6, the valve 91b will be closed and valve 75a and valve 76a are opened to lead high pressure water into said inner bail 93 through holes 95b, 93a. The filter holes of said inner bail 93 should not be coincided with the holes of said outer bail 95 when overlapping said two bails as dotted line shown in FIG. 6 so that the water coming through pipe 76 will force said small piston 94 forwards and when the door 96 is opened, the squeezed sludge will be expelled to load on a truck T. Then close the valve 96d, 76a, 74a and open valves 77a and drain valves 76b, 91e so that the pressure after said piston 94 and piston 92 will be released and the incoming water will push said piston 94 backwards so as to retract said inner bail 93 and piston 92 to their original position. By opening the drain valve 77b to release the water before said piston 94, the present sludge consolidating means will finish its first compression cycle to be ready for next cycle. The continuous operation of said means 9 will consolidate the sludge to reduce their volume for easier disposal.

During initial consolidating process, a spring door 95'a is provided between the outer bail 95 and the surge tank 91a so as to enhance the filtration of water of incoming sludge-laden water. After overlapping said two bails 93 and 95, the door 95'a will be opened to drive in the water and sand. A branch 91h is provided on said pipe 91d to charge the new sand and the water will be released through a pipe 91i.

The advantages of the present invention are shown as follows:

1. The present system may automatically discharge the sludge or sand laden water by a great head deeply under dam lake so that the energy as driving conventional pump may be saved.
2. By using the present sludge consolidating means, the sludge can be treated in a smaller space than that by conventional disposal method.
3. The delivery pipe can be suitably chosen in diameter to increase flow rate of sludge laden water and to reduce the ratio of water to sand (kgs water/kg sand) so that the lake water will not be greatly wasted as compared to conventional pumping method.
4. The operation and installation cost of the present invention will be minimized to increase its economic value.

The present sludge consolidating means may be designed as automatic or semi-automatic control so that the opening and closing of the related valves can be operated easily and conveniently.

I claim:

1. An improved system for removing sludge from dam reservoir comprising a suction port, a delivery pipe, a float, a tug boat, several universal joints connected within said delivery pipe, a concentration alarming indicator, a boosting pipe, an ejector and a sludge consolidating means, being characterized in that said boosting pipe may deliver a high pressure stream into nozzles of said ejector to suck the air and water in said delivery pipe connected to the throat of said ejector to start a syphon effect so as to automatically discharge the sludge or sand laden in the fluid through said delivery pipe.

2. A system according to claim 1 wherein said suction port comprises an extension pan disposed on the entrance pipe of said delivery pipe, one or several filter screens pivotedly connected on said extension pan, a wire connecting said screens to said float on water surface, a spring connecting said screens to said extension pan for normal closing said screens, a water hose connected from said float to said extension pan on which several nozzles are formed to spray the high pressure stream from said hose and a wire connecting said port onto said float which is pulled by a tub boat afloat on reservoir surface.

3. A system according to claim 1 wherein said universal joint comprises a spherical socket having a segment cut and a semi-spherical cup, both being freely coupled and each being connected to said delivery pipe.

4. A system according to claim 1 wherein said concentration alarming indicator comprises an inlet tube leading sludge laden water from said delivery pipe, a container, a gravity meter freely moving along a central collar provided in said container, a high concentration alarm, a low concentration alarm and a discharge tube so that said gravity meter having an extension stick may flip said high or low concentration alarm depending upon the concentration of incoming water.

5. A system according to claim 1 wherein said boosting pipe comprises an entrance port having filter screen positioned above the sandy or muddy layer near the lake bottom, a pipe passing said dam, and two outlet branches in that one branch is leading into nozzles of said ejector and another branch is leading into said sludge consolidating means.

6. A system according to claim 1 wherein said delivery pipe comprises an entrance pipe connected to said suction port, a vertical pipe connected to said entrance pipe, a horizontal pipe which is backed by several floats afloat on the water surface and is fixed by anchors immersed in the lake bottom, a horizontal pipe passing said dam and a downward pipe terminated with a valve and an end pipe connected to the throat of said ejector and wherein several valves and angle valve are provided within said horizontal pipe for occassionally flushing said pipe.

7. A system according to claim 1 wherein said boosting pipe and said ejector may be omitted and said horizontal pipe of said delivery pipe is fixed under several said floats to immerse said delivery pipe under water so as to directly lead the sludge laden water from said suction port.

8. A system according to claim 1 wherein said ejector discharges the sludge water into said sludge consolidating means for squeezing water included therein and one branch of said boosting pipe is connected to said sludge consolidating means to lead high pressure water to drive said consolidating means for squeezing the sludge.

9. A system according to claim 1 wherein said sludge consolidating means comprises a compression cylinder, a large piston engaged within said cylinder, an inner filter bail having filter holes being fixed onto said large piston and movably engaged within an outer filter bail, an outer filter bail having filter holes being fixed in the front portion of said cylinder, a small piston movably engaged within said inner filter bail, and a door which is composed of an inside wall having filter holes and a solid outside wall having several outlet valves and is filled with filter sand in said door between said two walls and a surge tank having water drain pipe and sand discharge pipe being provided ahead said cylinder wherein filter sand is partially filled between the cylinder casing and said two filter bails.

10. A system according to claim 1 wherein the water inlet pipe is connected a by-pass water pipe which is connected to a branch pipe at middle portion of said sludge consolidating means to lead high pressure stream into hole of said outer filter bail and a hole of said inner filter bail when overlapping said two bails of which the filter holes of each bail are not coincided with one another to expel the squeezed sludge outwards, and wherein said by-pass water pipe is connected to another branch pipe at the front portion of said consolidating means to lead high pressure stream through a hole formed on said outer filter bail near the cylinder door for retracting said small piston after removing the squeezed sludge therefrom.

* * * * *